United States Patent
Noh et al.

(10) Patent No.: US 12,511,526 B2
(45) Date of Patent: Dec. 30, 2025

(54) METHOD FOR PREDICTING A MOLECULAR STRUCTURE

(71) Applicants: HYUNDAI MOTOR COMPANY, Seoul (KR); KIA CORPORATION, Seoul (KR); YONSEI UNIVERSITY, UNIVERSITY-INDUSTRY FOUNDATION (UIF), Seoul (KR)

(72) Inventors: Seunghyo Noh, Uiwang-si (KR); Kyungju Nam, Seoul (KR); Byungchan Han, Seoul (KR)

(73) Assignees: HYUNDAI MOTOR COMPANY, Seoul (KR); KIA CORPORATION, Seoul (KR); YONSEI UNIVERSITY, UNIVERSITY-INDUSTRY FOUNDATION (UIF), Seoul (KR)

( * ) Notice: Subject to any disclaimer, the term of this patent is extended or adjusted under 35 U.S.C. 154(b) by 862 days.

(21) Appl. No.: 17/830,142

(22) Filed: Jun. 1, 2022

(65) Prior Publication Data

US 2022/0405563 A1    Dec. 22, 2022

(30) Foreign Application Priority Data

Jun. 18, 2021    (KR) .......................... 10-2021-0079162

(51) Int. Cl.
*G06N 3/04*    (2023.01)
*G06N 3/065*    (2023.01)
*G06N 10/20*    (2022.01)

(52) U.S. Cl.
CPC .............. *G06N 3/065* (2023.01); *G06N 3/04* (2013.01); *G06N 10/20* (2022.01)

(58) Field of Classification Search
CPC ........ G16C 20/70; G16C 20/30; G16C 10/00; G16C 20/20
See application file for complete search history.

(56) References Cited

U.S. PATENT DOCUMENTS

| | | | |
|---|---|---|---|
| 11,514,349 B1* | 11/2022 | Rei | G06N 7/01 |
| 2022/0188696 A1* | 6/2022 | Yang | G01N 23/04 |
| 2022/0398717 A1* | 12/2022 | Hébert | A61N 5/1037 |

FOREIGN PATENT DOCUMENTS

WO    WO-2019169384 A1 *    9/2019    .......... G06N 3/0454

OTHER PUBLICATIONS

Takamoto et al., "TeaNet: Universal Neural Network Interatomic Potential Inspired by Iterative Electronic Relaxations," in arXiv preprint arXiv:1912.01398 (2019). (Year: 2019).*

(Continued)

*Primary Examiner* — Ryan C Vaughn
(74) *Attorney, Agent, or Firm* — Lempia Summerfield Katz LLC

(57) ABSTRACT

A method for predicting a molecular structure includes: preparing a learning data set including first learning data including an eigenvector value and a quantum mechanics calculation value for a monoatomic and molecular structural model, a bulk structural model, a slab structural model, and a nanoparticle structural model of a material including a plurality of elements; learning an artificial neural network using the learning data set to obtain a potential value; and predicting a molecular structure of another material by using the potential value.

9 Claims, 13 Drawing Sheets

(56) References Cited

OTHER PUBLICATIONS

Wellendorff et al., "Density Functionals for Surface Science: Exchange-Correlation Model Development with Bayesian Error Estimation," in 85 Physical Rev. B 235149 (2012). (Year: 2012).*
C. Moller and M. S. Plesset, Note on an Approximation Treatment for Many-Electron Systems, Physical Review, vol. 46, 1934; 5 pp.
C.C. J. Roothan, New Developments in Molecular Orbital Theory, Reviews of Modern Physics; vol. 23, 1951; 21 pp.
David E. Rumelhart et al., Learning representations by back-propagating errors, Nature, vol. 323, 1986; https://doi.org/10.1038/323533a0; 4 pp.
L. A. Curtiss et al., Gaussian-2 theory for molecular energies of first- and second-row compounds, J. Chem. Phys.; vol. 94, 1991; 11 pp.
L. A. Curtiss et al., Gaussian-3 (G3) theory for molecules containing first and second-row atoms, Journal of Chemical Physics; vol. 109, 1998; 13 pp.
R. Seeger and J. A. Pople, Selfconsistent molecular orbital methods. XVIII. Constraints and stability in Hartree-Fock theory, Journal of Chemical Physics, vol. 66, 1977; 7 pp.

\* cited by examiner

METHOD FOR PREDICTING A MOLECULAR STRUCTURE

CROSS-REFERENCE TO RELATED APPLICATION

This application claims priority to and the benefit of Korean Patent Application No. 10-2021-0079162 filed in the Korean Intellectual Property Office on Jun. 18, 2021 the entire contents of which are incorporated herein by reference.

BACKGROUND

(a) Field of the Disclosure

The present disclosure relates to a method for predicting a molecular structure, and more particularly, to a method for obtaining a universal potential value using an artificial neural network and predicting the molecular structure of a new material using the same.

(b) Description of the Related Art

Accurate understanding of various physical properties such as a polymer, a macromolecule, and a compound is essential for all decision-making matters throughout the production and consumption process such as reviewing feasibility of the use of the molecules or designing synthesis and purification, setting a method and condition of storage, transport, use, disposal, and the like, and thus is very important both industrially and academically.

A method to obtain the physical properties of molecules most directly is to conduct an experiment, but this method requires considerable cost and time in various aspects such as preparation of a purified sample, environment-setting for accurate measurement, and the like, which may be impossible in some cases. Accordingly, various alternatives such as modeling, computational modeling, and the like have been suggested.

As a method for building a predictive model, a first-principle computational simulation based on quantum mechanics is known to have very high accuracy in predicting the properties of molecules. However, in general, the first-principle computational simulation method has a disadvantage of requiring a very high computational load according to an increase in molecular sizes and complexity of molecular structures. Accordingly, after sampling appropriate molecular structures and applying computational difficulty, a method of precisely correcting expected errors by using QSPR (quantitative structure-property relationship) is alternatively adopted. QSPR basically starts from an assumption that physical properties of a given molecule are a function of structural properties thereof and is essentially to discover various molecular control descriptors. Thousands of the molecular control descriptors have been proposed so far, which range from simple ones defined by the number of atoms in one molecule to complex ones defined by molecular shapes or connection states and electrochemical characteristics.

Another method of building the QSPR model is to use an artificial neural network. The artificial neural network technique is to create a mechanical learning method that mimics the working mechanism of human nerve cells and has been used for information processing in various fields, since it appeared in the mid-20$^{th}$ century.

FIG. 1 shows a typical example of an artificial neural network. The artificial neural network has an input layer that receives input data, an output layer that creates output data, and a hidden layer disposed therebetween. Each layer is composed of one or more nodes. Each node of the hidden layer is interconnected with the nodes of the input layer and the output layer by quantities $w_{ij}$ and $w'_{ij}$ called weights. Each node of the hidden layer and the output layer receives input values from the nodes of the previous stage and calculates them to create output values. In this case, functions $f_1$ and $f_2$ called activation functions are applied.

In order to apply this artificial neural network theory to actual information processing technology, it is necessary to learn the computer using a sample, i.e., a learning set, in which various input values and corresponding output values are bundled together. Specifically, the weight for each connection point is optimized using a back propagation algorithm so that the difference between the predicted value and the actual value of the artificial neural network for a given input is minimized. After completing this learning, the artificial neural network autonomously establishes rules without providing the necessary rules or knowledge for problem solving and derives valid output values for arbitrary input values. Thus, it is being used as a very useful tool for systems lacking a basic theory, such as predicting the properties of unknown compounds.

However, while the artificial neural network method may improve both the accuracy and speed of calculation, it is difficult to construct a learning set for intramolecular and intermolecular interactions. Specifically, in the conventional artificial neural network method, only the arrangement between atoms in a fixed particle may be changed, and it is difficult to cope with particle deformation (e.g., dissolution, aggregation, or phase transition).

SUMMARY OF THE DISCLOSURE

An embodiment may provide a method for predicting a molecular structure which may configure a learning data set that can learn an artificial neural network with high efficiency and low cost, may apply artificial neural network technology to obtain a potential value that can predict energy for various particles and particle deformation (e.g., dissolution, aggregation, or phase transition) at a faster rate compared to quantum mechanical calculation, and may improve the efficiency of designing a new material by predicting the structure and physical properties of a new material using this potential value.

An embodiment provides a method for predicting a molecular structure that includes: preparing a learning data set including first learning data including an eigenvector value and a quantum mechanics calculation value for a monoatomic and molecular structural model, a bulk structural model, a slab structural model, and a nanoparticle structural model of a material including a plurality of elements; learning an artificial neural network using the learning data set to obtain a potential value; and predicting a molecular structure of another material by using the potential value.

The first learning data may further include an eigenvector value and a quantum mechanics calculation value for a defect structural model or an amorphous structural model.

The learning data set may further include second learning data including an eigenvector value and a quantum mechanics calculation value for a structural model obtained by molecular dynamics calculation using an effective medium theoretical potential value.

The learning data set may further include third learning data including an eigenvector value and a quantum mechanics calculation value for a structural model in which quantum mechanical calculation values are different from predicted values obtained using the first learning data and the second learning data, The learning data set may further include fourth learning data including an eigenvector value and a quantum mechanics calculation value for a structural model generated during stable structural relaxation of the amorphous structural model, a structural model generated during stable structural relaxation of the defect structural model, a structural model generated during stable structural relaxation of the slab structural model, or a combination thereof.

The learning data set may further include fifth learning data including an eigenvector value and a quantum mechanics calculation value for a structural model generated during stable structural relaxation of a structure obtained by molecular dynamics calculation using an effective medium theoretical potential value or a structural model generated during stable structural relaxation of a structural model of the third learning data.

The learning data set may include sixth learning data including the first learning data to the fifth learning data.

The learning data set may include seventh learning data including the first learning data and the fifth learning data.

The eigenvector value for the structural model may be obtained as a Gaussian-type symmetric function.

The Gaussian-type symmetric function may be expressed by Equation 1 or Equation 2.

$$G_i^{II} = \sum_{j \neq i}^{\substack{atoms\ j\ within\ R_c \\ distance\ of\ atom\ i}} e^{-\eta(R_{ij}-R_s)^2/R_c^2} f_c(R_{ij}) \qquad \text{[Equation 1]}$$

In Equation 1, $R_{ij}$ is a distance between atom i and atom j, $R_s$ and $\eta$ are variables controlling the shape of the graph, and $f_c$ is a cut-off function, which is expressed by Equation 3.

$$G_i^{IV} = 2^{1-\varsigma} \sum_{\substack{j,k \neq i \\ (j \neq k)}}^{\substack{atoms\ j,k\ within\ R_c \\ distance\ of\ atom\ i}} (1+\lambda \cos\theta_{ijk})^\varsigma \\ e^{-\eta(R_{ij}^2+R_{ik}^2+R_{jk}^2)/R_c^2} f_c(R_{ij}) f_c(R_{ik}) f_c(R_{jk}) \qquad \text{[Equation 2]}$$

In Equation 2, $R_{ij}$ is a distance between atom i and atom j, $R_{ik}$ is a distance between atom i and atom k, $R_{jk}$ is a distance between atom j and atom k, $R_s$, $\eta$, $\lambda$, and $\varsigma$ are variables controlling the shape of the graph, and $f_c$ is a cut-off function, which is expressed by Equation 3.

$$\text{when } r \neq R_c,\ fc = 0.5\left(1+\cos\left(\pi \frac{r}{Rc}\right)\right) \qquad \text{[Equation 3]}$$

$$\text{when } r > R_c,\ fc = 0.$$

In Equation 3, r is a radius of the neighbor atom from the center atom and Rc is a limiting radius (i.e., cutoff-radius) for limiting the effect on the center atom.

The eigenvector value may be obtained by changing $\eta$, $\lambda$, $\varsigma$, or a combination thereof in Equation 1 or Equation 2.

In the obtaining of the potential value, each of the eigenvector values for the structural model may be an input value of the artificial neural network, and a potential value for the entire structure of the material may be an output value.

In the obtaining of the potential value, when an error of the output value is greater than or equal to about 25 meV/atom, reconstructing the learning data set and then learning the artificial neural network using the reconstructed learning data set to obtain the potential value may be repeated.

The method for predicting a molecular structure according to an embodiment may configure a learning data set that can learn an artificial neural network with high efficiency and low cost, may apply artificial neural network technology to obtain a potential value that can predict energy for various particles and particle deformation (e.g., dissolution, aggregation, or phase transition) at a faster rate compared to quantum mechanical calculation, and may improve the efficiency of designing a new material by predicting the structure and physical properties of a new material using this potential value.

DETAILED DESCRIPTION OF THE EMBODIMENTS

Figure 1:
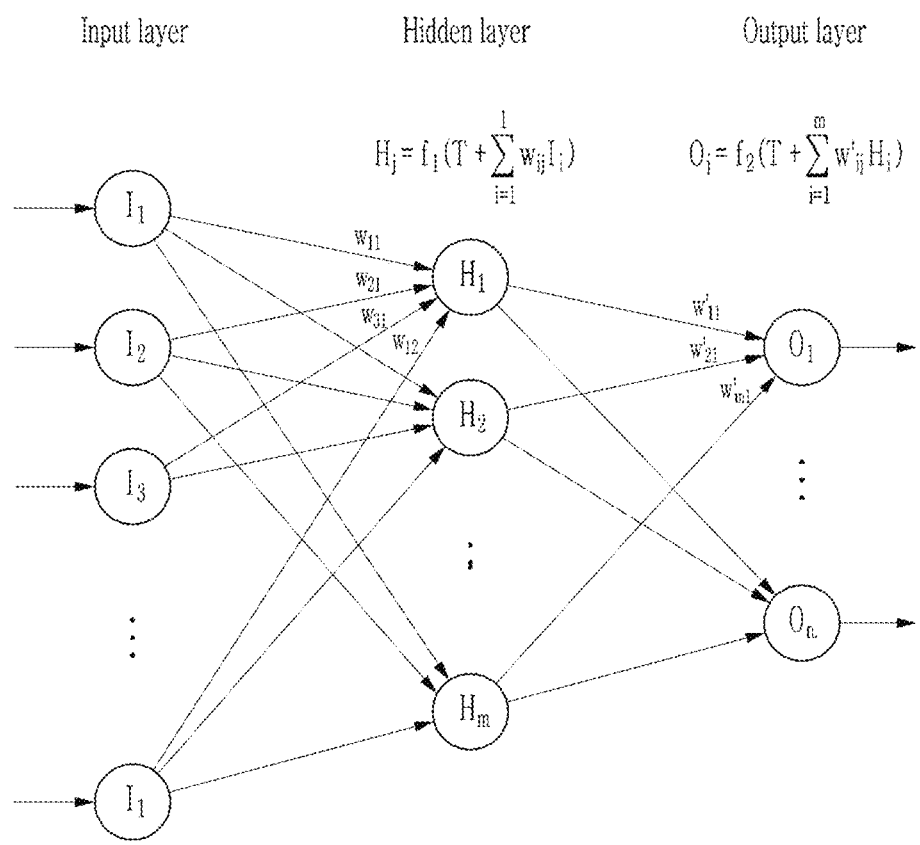
FIG. 1 is a view illustrating an example of an artificial neural network.

The advantages and features of the present disclosure and the methods for accomplishing the same should be apparent from the embodiments described hereinafter with reference to the accompanying drawings. However, the embodiments should not be construed as being limited to the embodiments set forth herein. Unless otherwise defined, all terms (including technical and scientific terms) used herein have the same meaning as commonly understood by one of ordinary skill in the art. The terms defined in a generally-used dictionary may not be interpreted ideally or exaggeratedly unless clearly defined. In addition, unless explicitly described to the contrary, the word "comprise," and variations such as "comprises" or "comprising", should be understood to imply the inclusion of stated elements but not the exclusion of any other elements.

Since each block in the accompanying block diagram and combinations of steps in the flowchart may be executed by computer program instructions (execution engine), and these computer program instructions may be mounted in the processor of a general-purpose computer, a special-purpose computer, or other programmable data processing equipment, the instructions, executed by the processor of a computer or other programmable data processing equipment, will generate means for performing the functions described in each block of the block diagram or in each step of the flowchart.

These computer program instructions may also be stored in a computer-usable or computer-readable memory that may direct a computer or other programmable data processing equipment to implement a function in a particular manner. Thus, it is also possible that the instructions stored in the computer-usable or computer-readable memory produce an article of manufacture containing instruction means for performing the function described in each block of the block diagram or in each step of the flowchart.

And since the computer program instructions may be mounted on a computer or other programmable data processing equipment, a series of operating steps may be performed on the computer or other programmable data processing equipment to generate a computer-executable process so that the instructions for performing the computer or other programmable data processing equipment may provide steps for executing the functions described in each block of the block diagram and each step of the flowchart.

Also, each block or step may represent a module, segment, or portion of code including one or more executable instructions for executing specified logical functions, and in some alternative embodiments, it is also possible for the specified functions to occur out of sequence described in the blocks or steps. For example, it is possible that two blocks or steps shown one after another may be performed substantially simultaneously, and also the blocks or steps may be performed in the reverse order of the corresponding functions, if necessary.

Hereinafter, embodiments of the present disclosure are described in detail with reference to the accompanying drawings. However, the embodiments of the present disclosure illustrated below may be modified in various other forms, and the scope of the present disclosure is not limited to the embodiments described below. Embodiments of the present disclosure are provided in order to more completely explain the present disclosure to those having ordinary skill in the art.

FIG. 1 is a view illustrating an example of an artificial neural network.

Figure 2:
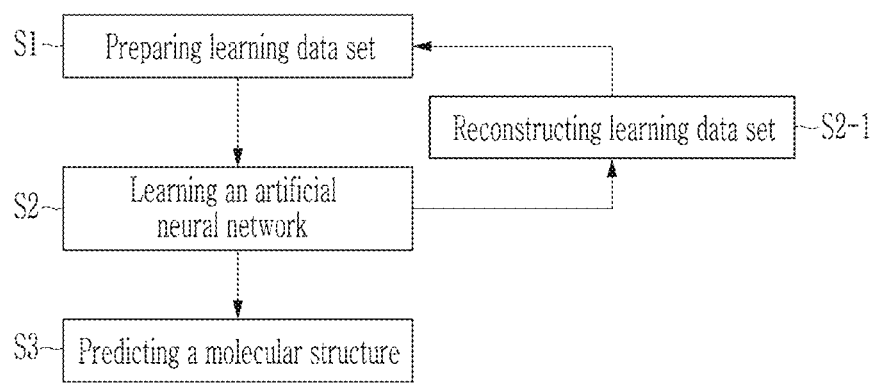
FIG. 2 is a flowchart illustrating a method for predicting a molecular structure according to an embodiment.

FIG. 2 is a flowchart illustrating a method for predicting a molecular structure according to an embodiment.

Hereinafter, the method for predicting a molecular structure is described in detail with reference to FIGS. 1 and 2.

The method for predicting a molecular structure according to an embodiment may use a prediction model implemented with an artificial neural network. As shown in FIG. 1, the prediction model includes an input layer including a plurality of input nodes, a hidden layer including a plurality of hidden nodes that are multiplied by weights corresponding to inputs of each of the plurality of input nodes and transmitted, and an output layer including output nodes to which a weight corresponding to an output of each of the plurality of hidden nodes is multiplied and transmitted.

Each of the plurality of hidden nodes may process inputs according to a corresponding activation function to generate an output, and each of the plurality of output nodes may process inputs according to a corresponding activation function to generate an output. Although only one hidden layer is illustrated in FIG. 1, the prediction model may further include two or more hidden layers.

The method for predicting the molecular structure includes preparing a learning data set (S1), learning an artificial neural network (S2), and predicting a molecular structure (S3).

In the preparing of the learning data set (S1), a learning data set for learning the artificial neural network is prepared. The learning data set includes an eigenvector value and a quantum mechanics calculation value for a structural model of a material including a plurality of elements. As an example, the learning data set includes eigenvector values for each structural model input to the input layer, and quantum mechanics calculation values corresponding to potential values for the entire structure of the material predicted by the output layer.

The material including the plurality of elements may be a metal, a metal alloy, an organic material, a polymer, a macromolecule, or a compound including 1,000 or more atoms. For example, the material including the plurality of elements may be a catalyst including platinum, a binary alloy such as PtFe, or a ternary alloy such as PtFeCu.

The structural model of a material including the plurality of elements may include a monoatomic and molecular structural model, a bulk structural model, a slab structural model, and a nanoparticle structural model as a basic structural model.

In addition, the structural model of the material including the plurality of elements may optionally further include a defect structural model, or an amorphous structural model.

Figure 3:
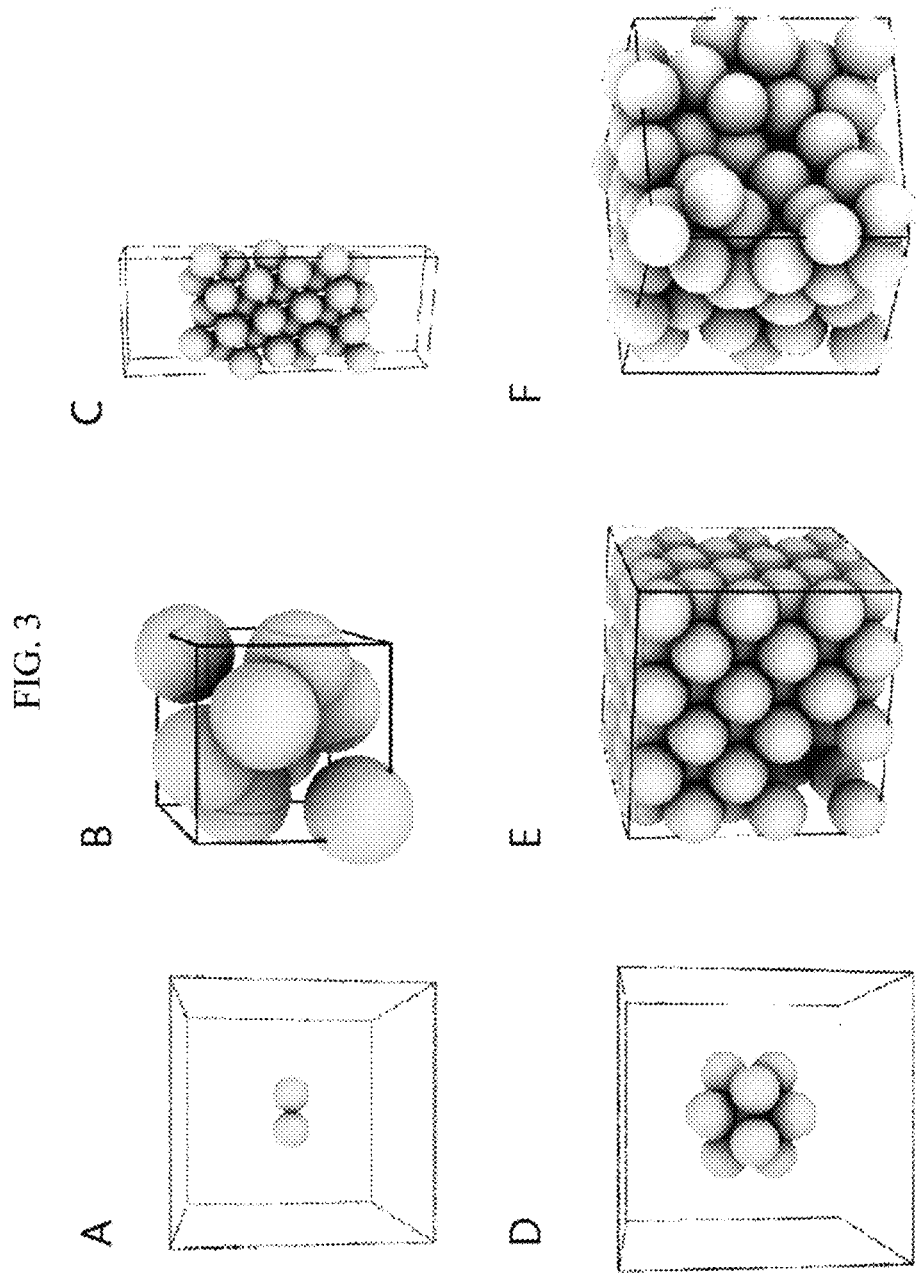
FIG. 3 is a view illustrating examples of a monoatomic and molecular structural model, a bulk structural model, a slab structural model, a nanoparticle structural model, and a defect structural model.

A to F of FIG. 3 are views illustrating examples of each monoatomic and molecular structural model, bulk structural model, slab structural model, nanoparticle structural model, and defect structural model.

The monoatomic and molecular structural model of FIG. 3 may be obtained using a material studio. The bulk structural model may be obtained by a simple cubic (sc) structure, a body-centered cubic (bcc) structure, a face-centered cubic (fcc) structure, and a hexagonal closed packed (hcp) structure, as solid crystal structures. The slab structural model and the nanoparticle structural model may be obtained by making a slab or a defect based on the previously produced bulk structural model.

As such, the learning data set includes, as a basic structural model, a monoatomic and molecular structural model, a bulk structural model, a slab structural model, and a nanoparticle structural model, and optionally data for a defect structural model, or an amorphous structural model. Thus, it is possible to obtain a universal potential value capable of predicting energy for various particles and particle deformation (e.g., dissolution, aggregation, or phase transition). In addition, the learning data set may construct an optimal learning data set with high efficiency and low cost by variously combining and testing several types of structural models.

As an example, the learning data set may include first learning data including an eigenvector value and a quantum mechanics calculation value for a basic structural model.

As another example, the learning data set, in addition to the first learning data for each structural model, may further include second learning data including an eigenvector value and a quantum mechanics calculation value for the structural model obtained by molecular dynamics calculation using the effective medium theoretical potential value, which is very fast to calculate.

Figure 4:
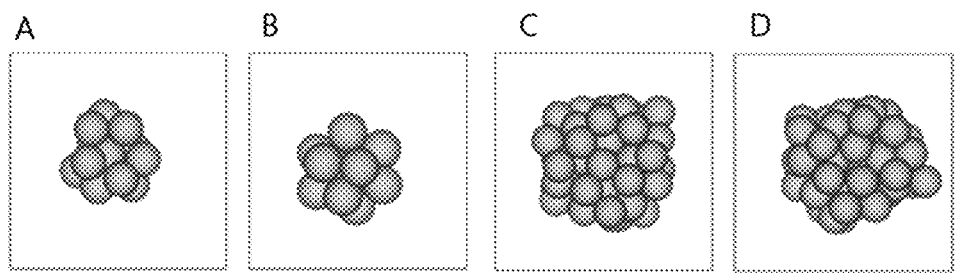
FIG. 4 is a view illustrating structural models obtained by molecular dynamics calculation using an effective medium theoretical potential value.

FIG. 4 is a view illustrating structural models obtained by molecular dynamics calculation using an effective medium theoretical potential value. A to D of FIG. 4 show cases for nanoparticles having a different number of elements, respectively; A and B of FIG. 4 show cases for nanoparticles having about 55 elements; and C and D of FIG. 4 show cases for nanoparticles having about 147 elements.

As another example, the learning data set may further include a third learning data including an eigenvector value and a quantum mechanics calculation value for an unstable structural model, which are different predicted values and quantum mechanics calculation values obtained using the first learning data and the second learning data.

Specifically, first, the artificial neural network is learned using the learning data set including the first learning data for the basic structural model and the second learning data for the structural model obtained by molecular dynamics calculation using the effective medium theoretical potential value, to obtain the potential value. Using this potential value, predicted values for a structural model which are not included in the learning data set are obtained. The third learning data for the unstable structural model different from the predicted values and the quantum mechanics calculation values may be further included in the learning data set. For example, when the difference between the predicted values and the quantum mechanics calculated values is greater than or equal to about 25 eV/atom, it may be defined as an unstable structural model.

Figure 5:
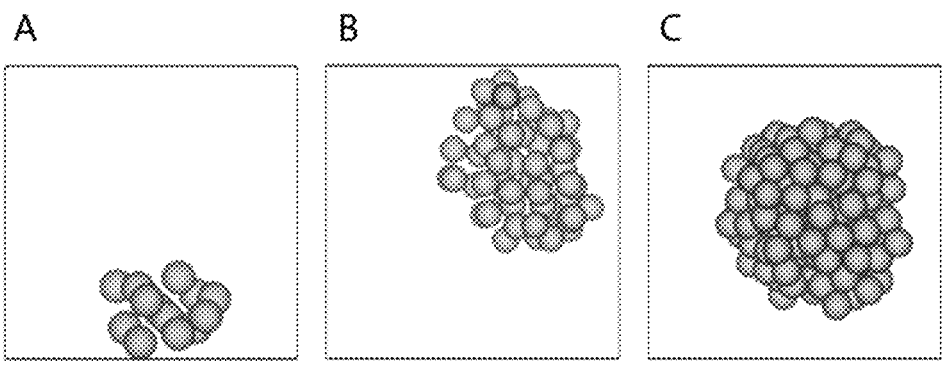
FIG. 5 is a view showing unstable structural models.

FIG. 5 is a view showing unstable models. A to C of FIG. 5 show cases for nanoparticles having a different number of elements, respectively. By adding the third learning data to the learning data set, the accuracy of the calculation may be further improved.

As another example, the learning data set may further include fourth learning data including an eigenvector value and a quantum mechanics calculation value for a structural model generated during stable structural relaxation of an amorphous structure, a structural model generated during stable structural relaxation of a defect structure, or a structural model generated during stable structural relaxation of a slab structure.

Figure 6:
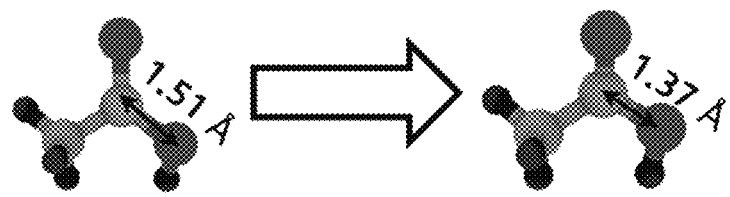
FIG. 6 is a diagram showing the structural relaxation of acetic acid.

FIG. 6 is a view showing the structural relaxation of acetic acid. In FIG. 6, the arrow indicates structural stabilization, the figure on the left of the arrow shows the initial structure of acetic acid, and the figure on the right of the arrow shows the relaxation structure of acetic acid. Referring to FIG. 6, the structural relaxation is a calculation in which the structure is changed from an initial structure (unstable structure) to a theoretically stable structure.

Figure 7:
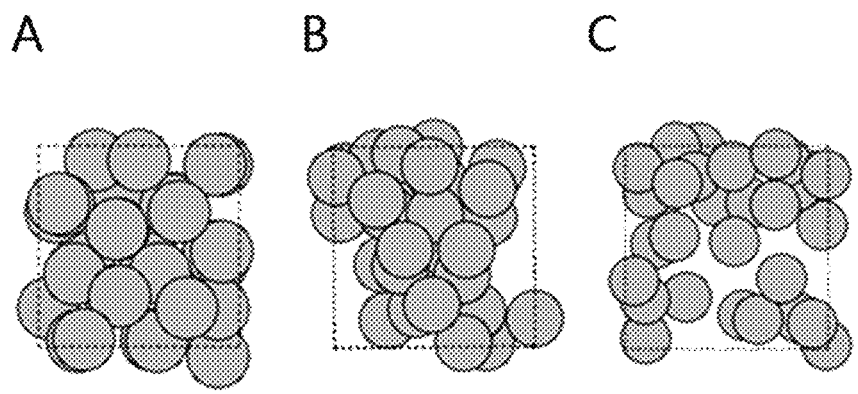
FIG. 7 is a view illustrating amorphous structural models having different densities.
Figure 8:
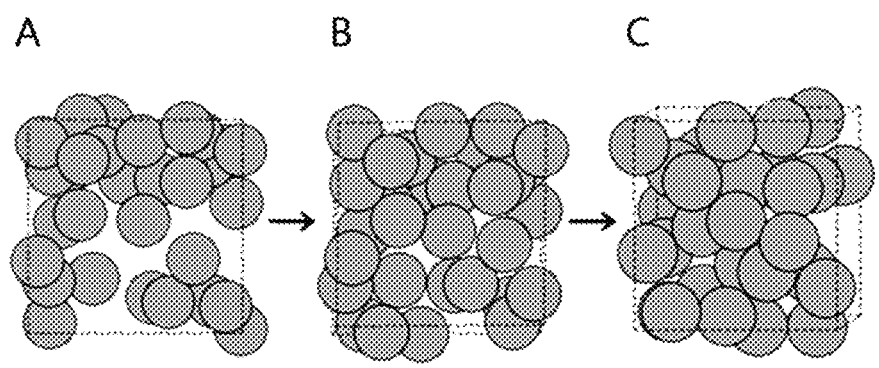
FIG. 8 is a view illustrating structural models generated during stable structural relaxation of an amorphous structure.

FIG. 7 is a view illustrating amorphous structural models having different densities and FIG. 8 is a view illustrating structural models generated during stable structural relaxation of an amorphous structure. In FIG. 7, A shows a high-density amorphous structural model, and C shows a low-density amorphous structural model. In FIG. 8, A shows the amorphous structural model before structural relaxation, and B and C show the structural model in which the amorphous structure of A is gradually structurally relaxed.

As another example, the learning data set may further include fifth learning data including an eigenvector value and a quantum mechanics calculation value for a structural model generated during stable structural relaxation of a structure obtained by molecular dynamics calculation using an effective medium theoretical potential value or a structural model generated during stable structural relaxation of the structural model (i.e., unstable structure) of the third learning data.

Figure 9:
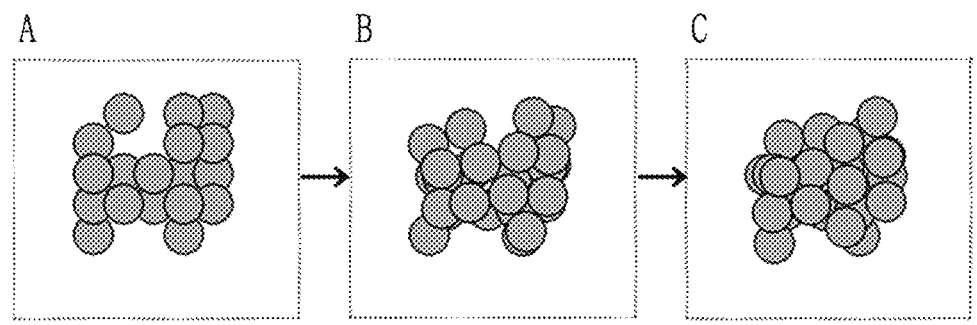
FIG. 9 is a view illustrating structural models generated during stable structural relaxation of an unstable multi-defect nanoparticle structure.

FIG. 9 shows the structural model generated during the gradual structural relaxation of the unstable multi-defect nanoparticle structure. In FIG. 9, A shows the structural model before structural relaxation, and B and C show the structural model in which the structure of A is gradually structurally relaxed. The initial model of the multi-defect nanoparticle structure may be obtained by generating half-defects in nanoparticles with 55 elements and nanoparticles with 147 elements.

As another example, the learning data set may include sixth learning data including the first learning data to the fifth learning data.

As another example, the learning data set may include seventh learning data including the first learning data and the fifth learning data. The basic structural model for obtaining the seventh learning data removes a defect structure and an adsorbed structure, removes a structure in which the periodic system is repeated, and may additionally perform a preprocessing to structurally relax a structure with a bouncing force value (e.g., a slab structure).

In addition, the learning data set may include various combinations of the first learning data to the seventh learning data.

Among the first to third learning data, the third learning data may exhibit a relatively low energy error and high accuracy. On the other hand, the fourth to seventh learning data also include a force value, and in the case of the seventh learning data, the root mean square (RMS) value is 17.82 meV and the force convergence value is 0.021 eV/Å, which is the lowest RMSE (root mean square error) value. For the fourth to seventh learning data, the most accurate learning may be possible.

Quantum mechanics calculations for these structural models are usually pure theory, and the solution to the electron energy is obtained by solving the Schrodinger equation. In the case of a system with many electrons, a solution can be obtained using the Hartree-Fock (HF) method [C. C. J. Roothan, Rev. Mod. Phys. 23, 69 (1951)], which applies an approximation method ignoring electron correlation.

This approximation method causes a fundamental error in the calculated result, and thus a more accurate solution is obtained using the Post Hartree-Fock methods [C. Moller and M. S. Plesset, Phys. Rev. 46, 618 (1934)] with the addition of a multidimensional theoretical perturbation term, but a relatively large amount of computation is required.

In this way, it is difficult in terms of cost or time to calculate large molecules.

In addition, the Gaussian method combining Hartley-Fork and Post-Hartley-Fork [L. A. Curtiss, K. Raghavachari, G. W. Trucks, and J. A, Pople, J. Chem. Phys. 94, 7221 (1991); L. A. Curtiss, K. Raghavachari, P. C. Redfern, V. Rassolov, and J. A. Pople, J. Chem. Phys. 109, 7764 (1998)] can show very little error in energy prediction.

In addition, in order to consider the interaction and correlation between electrons in a molecule composed of many electrons, the density functional theory [R. Seeger and J. A. Pople, J. Chem. Phys. 66, 3045 (1977)] may be applied using the electron density function to obtain the ground state using the function of the total energy, instead of the wave function, to which a multidimensional perturbation term is added. It can be calculated by applying the density functional theory to find the ground state using the function of the total energy. The advantage of the density functional theory is that it only needs to consider the electron density, and thus more accurate results can be obtained with a computational amount similar to that of the Hartree-Fock method. By using a combination of the exchange function and correlation function to calculate the exchange-correlation energy of electrons, better results can be obtained without increasing the amount of computation.

When directly using Cartesian coordinates consisting of the actual position x, y, and z for one atom, as input values for the structural model, the structure may be recognized as a different structure even though it is the same structure, due to the rotation of the structure.

In other words, in three-dimensional coordinates, even if the arrangement of atoms is the same based on the center atom, if the coordinates are moved or rotated, the input values become completely different.

Therefore, even if the structure is rotated, input values may be defined using a Gaussian-type symmetric function that can output the same vector based on symmetry. The symmetric function is a function that returns the same result even if the order combination of variables is changed. For example, in the case of $f(x,y)=x^2+xy+y^2$, the same value is output in the case of $f(y, x)$.

In other words, an eigenvector value defined by a Gaussian-type symmetric function may be an input value of the artificial neural network, and in this case, the eigenvector of the structural model may be used to classify the structure. As an example, the Gaussian-type symmetric function may be expressed by Equation 1 or Equation 2.

$$G_i^{II} = \sum_{\substack{j \neq i \\ \text{atoms } j \text{ within } R_c \\ \text{distance of atom i}}} e^{-\eta(R_{ij}-R_s)^2/R_c^2} f_c(R_{ij}) \quad \text{[Equation 1]}$$

In Equation 1, $R_{ij}$ is a distance between atom i and atom j, $R_s$ and $\eta$ are variables controlling the shape of the graph, and $f_c$ is a cut-off function, which is expressed by Equation 3. For example, $R_s$ may be about 0, and $\eta$ may be about 0.05 to about 80.

$$G_i^{IV} = 2^{1-\varsigma} \sum_{\substack{j,k \neq i \\ (j \neq k) \\ \text{atoms } j,k \text{ within } R_c \\ \text{distance of atom i}}} (1+\lambda\cos\theta_{ijk})^\varsigma \quad \text{[Equation 2]}$$

$$e^{-\eta(R_{ij}^2+R_{ik}^2+R_{jk}^2)/R_c^2} f_c(R_{ij})f_c(R_{ik})f_c(R_{jk})$$

In Equation 2, $R_{ij}$ is a distance between atom i and atom j, $R_{ik}$ is a distance between atom i and atom k, $R_{jk}$ is a distance between atom j and atom k, $R_s$, $\eta$, $\lambda$, and $\zeta$ are variables controlling the shape of the graph, and $f_c$ is a cut-off function, which is expressed by Equation 3. For example, $R_s$ may be 0, and $\eta,\lambda$, and $\zeta$ may each independently be about 0.05 to about 80.

$$\text{when } r \neq R_c, fc = 0.5\left(1+\cos\left(\pi\frac{r}{Rc}\right)\right) \quad \text{[Equation 3]}$$

$$\text{when } r > R_c, fc = 0.$$

In Equation 3, r is a radius of the neighbor atom from the center atom and Rc is a limiting radius (i.e., cutoff-radius) for limiting the effect on the center atom.

If the preprocessing is performed using the property of the symmetric function, a constant value may be output even if the surrounding atoms rotate or move based on the center atom in the three-dimensional structure. For example, Table 1 shows input values for a movement model or a rotation model using a Gaussian-type symmetric function expressed by Equation 1.

TABLE 1

| | η | Reference arrangement | Movement model | Rotation model |
|---|---|---|---|---|
| Cartesian coordinate system | none | 8, 8 | 9, 4 | 3, 8 |
| Symmetric function | 0.05 | 0.122 | 0.122 | 0.122 |
| transformation | 2 | 0.038 | 0.038 | 0.038 |
| | 4 | 0 011 | 0.011 | 0.011 |
| | 8 | 0.001 | 0.001 | 0.001 |

However, if an input value defined as a Gaussian-type symmetric function is expressed only as a scalar value, a problem of outputting the same value in another arrangement may occur. In other words, the arrangement around the atom may not be expressed as an eigenvalue.

In order to solve this problem, the arrangement of atoms is converted into a vector rather than a scalar value to create an arrangement of eigenvalues according to the structural arrangement. In other words, by changing $\eta$ in the Gaussian-type symmetric function of Equation 1, an eigenvector value for one atomic arrangement may be obtained.

Figure 10:
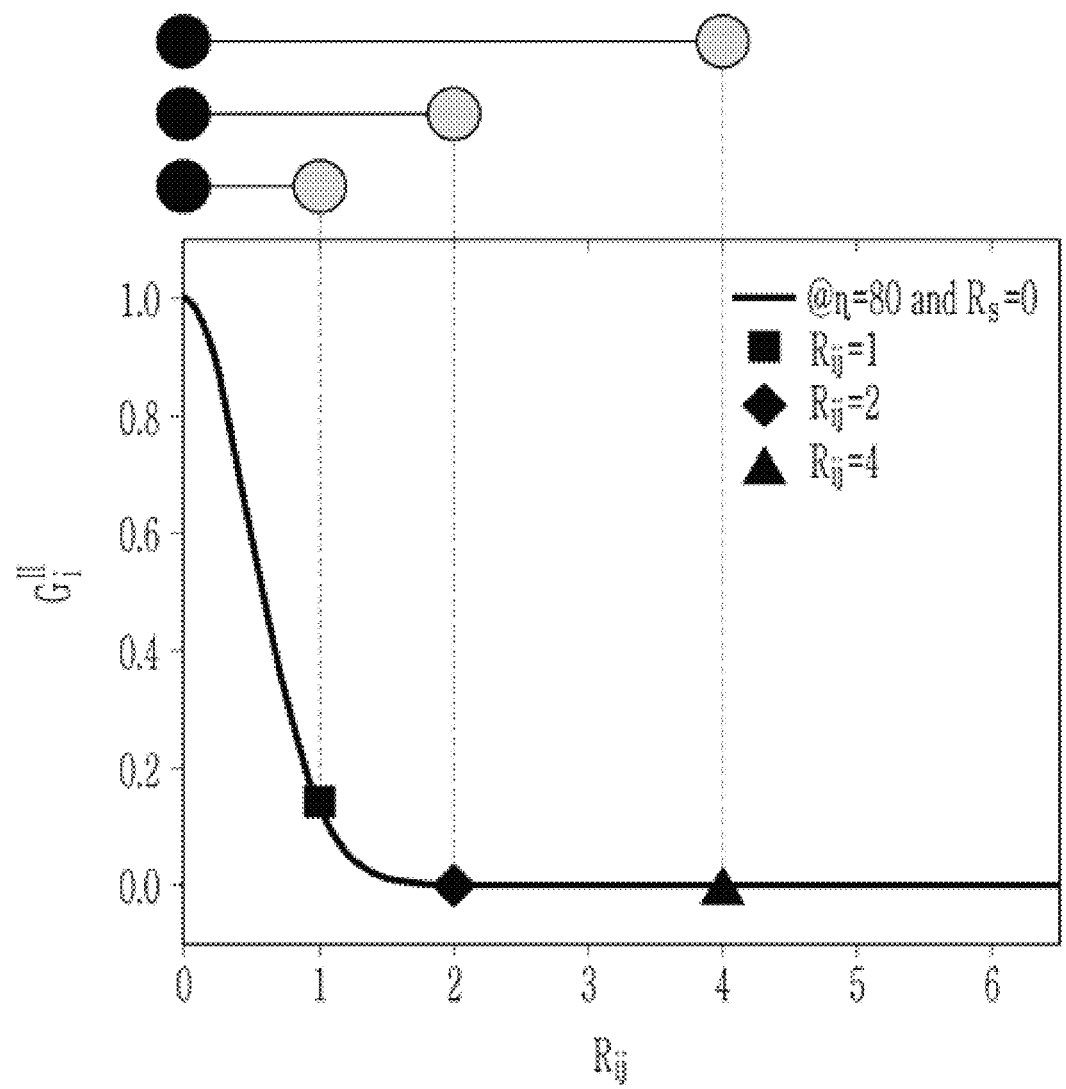
FIG. 10 is a graph showing scalar values according to the distance between atoms obtained by a Gaussian-type symmetric function ($\eta$=80).

For example, Table 2 shows the eigenvector values for the case where $R_{ij}$ is 1, 2, and 4 while changing $\eta$ to 0.05, 2, 4, 8, 20, 40, and 80. FIG. 10 is a graph showing the scalar values obtained from the Gaussian-type symmetric function according to the distance between atoms when $\eta$ is 80, and FIG. 11 is a graph showing the eigenvector values obtained from the Gaussian-type symmetric function according to the distance between the atoms when $\eta$ is changed.

TABLE 2

| | | $R_{ij}$ | | |
|---|---|---|---|---|
| | η | 1 | 2 | 4 |
| Scalar value | 80 | 0.142 | 4e−04 | 2.2e−14 |
| Eigenvector value | 80 | 0.142 | 4e−04 | 2.2e−14 |
| | 40 | 0.366 | 0.018 | 8.5e−08 |
| | 20 | 0.587 | 0.118 | 1.7e−04 |
| | 8 | 0.780 | 0.368 | 0.016 |
| | 4 | 0.858 | 0.537 | 0.071 |
| | 2 | 0.899 | 0.649 | 0.151 |
| | 0.05 | 0.942 | 0.780 | 0.317 |

Figure 11:
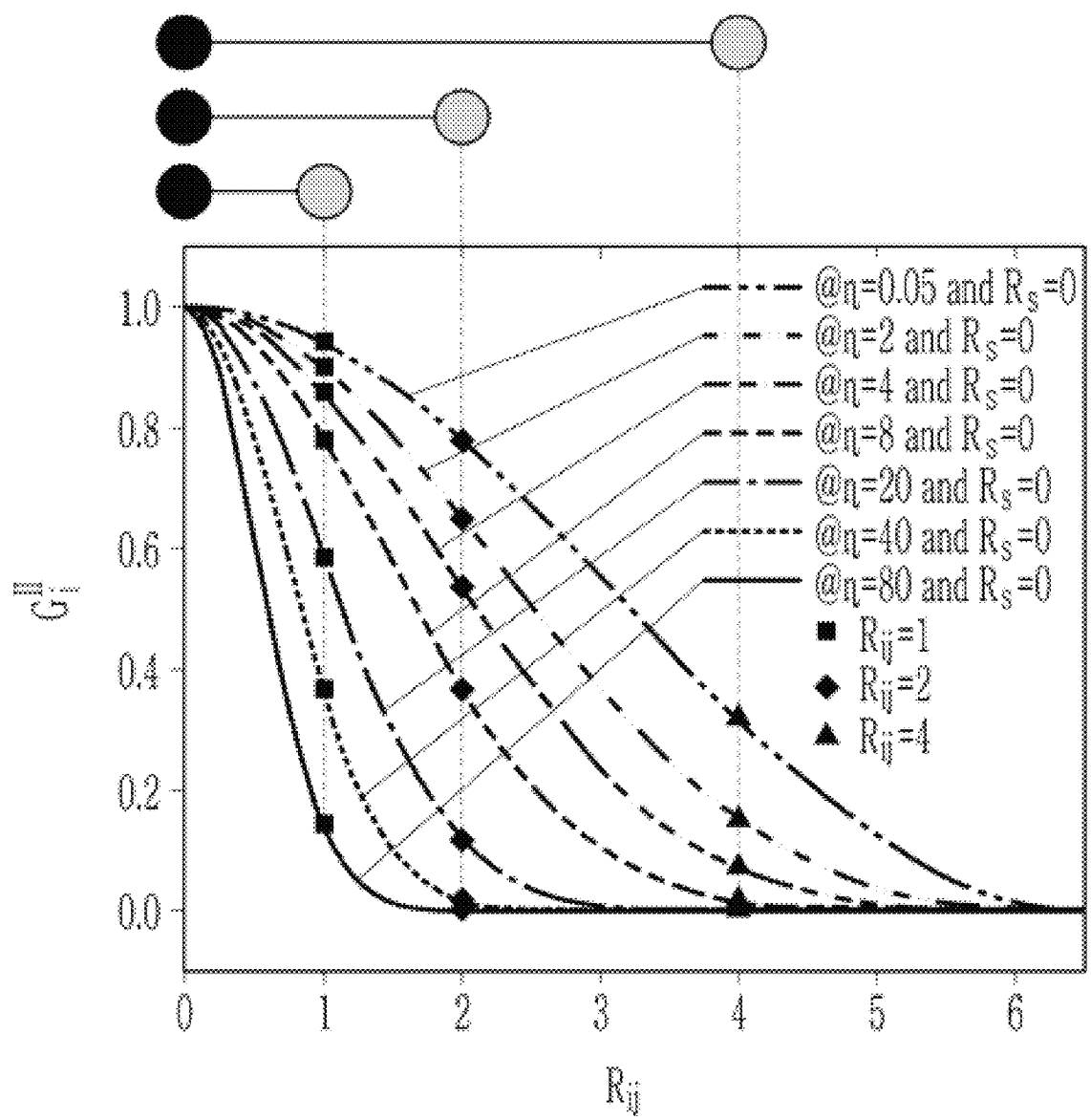
FIG. 11 is a graph showing eigenvector values obtained from a Gaussian-type symmetric function when $\eta$ is changed.

Referring to Table 2, FIGS. 10 and 11, if only a scalar value is output according to the structure, a case where $R_{ij}$ is 1 and a case where $R_{ij}$ is 2 can be distinguished, but a case where $R_{ij}$ is 2 and a case where $R_{ij}$ is 4, the values are similar and it may be difficult to distinguish the difference. In other words, similar (same) values may be output even if the structures are different.

Accordingly, when values obtained by changing η in the Gaussian-type symmetric function of Equation 1 are configured as eigenvector values for one atomic arrangement, the eigenvector values according to the atomic structure may be used as input values of an artificial neural network. In addition, in the Gaussian-type symmetric function of Equation 2, η, λ, and/or ζ may be changed to obtain eigenvector values, and the eigenvector values according to combinations of η, λ, and/or ζ may be input values of the artificial neural network. The symmetric function η in Equation 1 and the combinations of the symmetric functions η, λ, and/or ζ in Equation 2 may be used as input nodes. Therefore, the actual number of the input nodes is determined by using all of the eigenvector values calculated through Equations 1 and 2 as input values. For example, when n eigenvector values are calculated in Equation 1, and m eigenvector values are calculated in Equation 2, m+n eigenvector values in total are input values.

Next, in the learning of an artificial neural network (S2), a potential value is obtained by learning the artificial neural network using the generated learning data set. In other words, a potential value that can predict and simulate a new molecular structure may be generated through an artificial neural network based on the learning data set.

The artificial neural network model is a mathematical model that mimics the learning method of the human brain. Like a cerebral neural network, input signals to neurons and output signals from the neurons are expressed as each input/output node, and connection strength between the nodes is determined by strength of synapses. In the artificial neural network, a multilayer perceptron is often applied, which consists of an input layer, an output layer, and at least one hidden layer.

Each layer consists of a plurality of neurons, wherein neurons in each layer are connected to neurons in other layers by a connection weight. One neuron in the artificial neural network plays a role of one biological neuron in a biological neural network.

A value input into the input layer and a product of the value input into the input layer with a connection weight between the input layer and the hidden layer are added and then, input into neurons in the hidden layer, and the input value goes through a nonlinear activation function and outputs a different value therefrom. In addition, a process of delivering the output result to other neurons in another hidden layer or the output layer is called a feed forward operation, wherein the connection weight in the neural network is repetitively modified to match the calculated output with a desired target value, which may be defined as learning.

Herein, the modification and update of the connection weight may be performed by a back propagation learning algorithm (Rumelhart et al., 1986). In other words, an error of the output value is modified through the back propagation learning algorithm to adjust an artificial neural network parameter, a weight, and a bias.

When the specified epoch is reached, or the training error reaches the target value, the operation is stopped. The output value may be a potential value for the entire structure of a material.

In this case, when the error of the output value is greater than or equal to about 25 meV/atom, reconstructing the learning data set (S2-1) may be further included. In other words, the reconstructed learning data set may be repetitively used to make the artificial neural network execute learning, thereby obtaining another potential value. When the error of the output value is less than about 25 meV/atom, a potential value is created, proceeding to the next step.

In the predicting of the molecular structure (S3), the learned potential value may be utilized to predict new material structures that do not exist in the existing learning data set. For example, when energy of the new material is predicted by using a well-tuned artificial neural network, and the energy generates an error of greater than or equal to about 25 meV/atom, the learning data set may be reconstructed, until the error is reduced.

Figure 12:
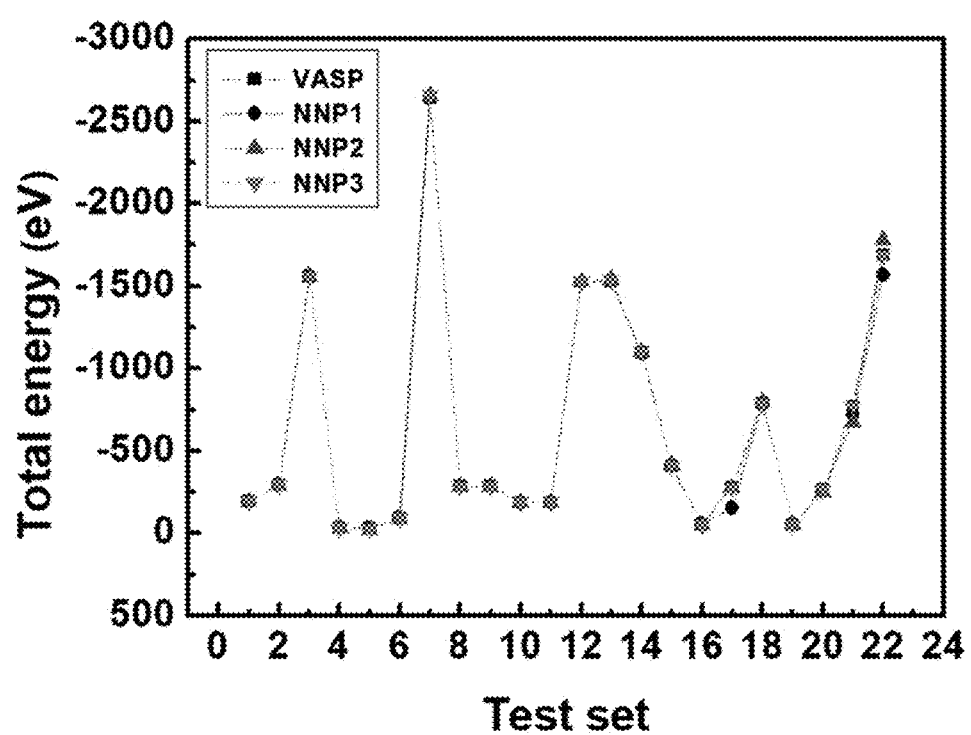
FIG. 12 is a graph illustrating a result of predicting a molecular structure not included in a learning data set by using a potential value learned using first to third learning data.

FIG. 12 is a graph illustrating a result of predicting a molecular structure not included in a learning data set by using a potential value learned using first to third learning data.

In FIG. 12, NNP 1 to NNP 3 is a case of using a training data set including first learning data, first and second learning data, and first to third learning data, respectively, and VASP represents the ground state energy of the structure calculated using the Vienna Ab-initio Simulation Package (VASP) software. In addition, in test sets 1 to 22, Nos. 1 to 3 are bulk structural models, Nos. 4 to 7 are slab structural models, Nos. 8 to 13 are defect structural models, Nos. 14 and 15 are truncated octahedron nanoparticle structural models, Nos. 16 to 18 are icosahedron nanoparticle structural models, and Nos. 19 to 22 are cuboctahedron nanoparticle structural models.

The RMSE errors according to the potentials of NNP 1 to NNP 3 obtained in FIG. 12 are shown in Table 3.

TABLE 3

|  | RMSE (meV/atom) |
| --- | --- |
| NNP 1 | 517.28 |
| NNP 2 | 218.95 |
| NNP 3 | 19.73 |

Referring to Table 3, NNP 1 to NNP 3 have RMSE errors according to potentials of 517.28 meV/atom, 218.95 meV/atom, and 19.73 meV/atom, respectively. In this example, the low error value RMSE means accurate energy prediction. Therefore, in the case of NNP 3, the RMSE error according to the potential value is 19.73 meV/atom, so that the most accurate energy prediction value may be obtained.

Figure 13:
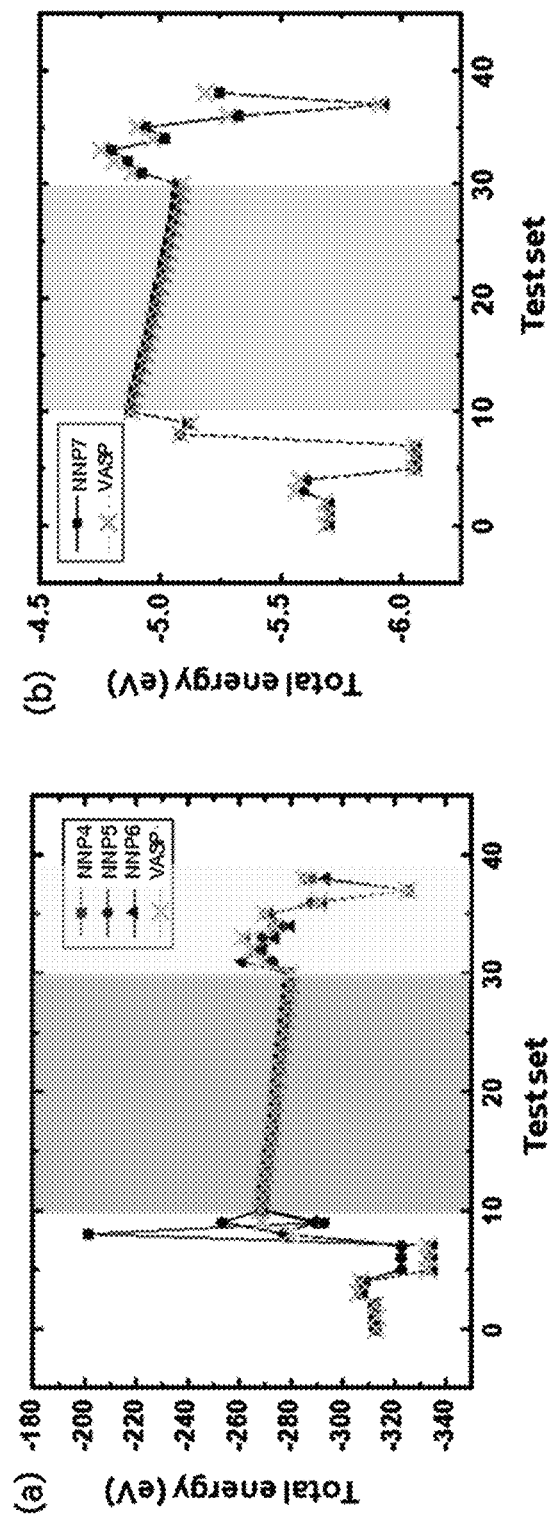
FIG. 13 is a graph illustrating a result of predicting a molecular structure not included in a learning data set by using a potential value learned using fourth to seventh learning data.

FIG. 13 is a graph illustrating a result of predicting a molecular structure not included in a learning data set by using a potential value learned using fourth to seventh learning data.

In FIG. 13, NNP 4 to NNP 7 respectively use learning data sets including first to fourth learning data, first to fifth learning data, sixth learning data, and seventh learning data, and VASP exhibits ground state energy of the corresponding structure calculated by using a Vienna Ab-initio Simulation Package (VASP) software. In addition, Test sets Nos. 1 to 10 out of Nos. 1 to 39 correspond to a bulk structural model, a slab structural model, and a structure of nanoparticles, Nos. 11 to 30 correspond to defective nanoparticles with variously distorted bond lengths and angles, and Nos. 31 and 39 correspond to amorphous structural models built by a material studio.

The RMSE error, energy convergence value, and force convergence value according to the potential values of NNP 4 to NNP 7 obtained in FIG. 13 are shown in Table 4.

TABLE 4

|  | RMSE (meV/atom) | Energy convergence value (eV) | Force convergence value (eV/Å) |
|---|---|---|---|
| NNP 4 | 121.69 | $7.21 \times 10^{-2}$ | 0.456 |
| NNP 5 | 24.43 | $2.05 \times 10^{-2}$ | 0.339 |
| NNP 6 | 19.46 | $2.29 \times 10^{-2}$ | 0.551 |
| NNP 7 | 17.82 | $5.20 \times 10^{-3}$ | 0.021 |

Referring to Table 4, in NNP 7, the RMSE error according to a potential value is about 17.82 meV/atom, the energy convergence value is about $5.20 \times 10^{-3}$ eV, and the force convergence value is about 0.021 eV/A, which provide the most accurate energy predicted values. In this way, the method for predicting a molecular structure according to an embodiment may provide a learning data set capable of efficiently reducing errors in the alloy structure of a metal material, and a potential value generated therefrom may be suitable for studying dissolution, aggregation, reaction, and the like of the material and thus actively used in the fields of semiconductors, magnetics, energy materials, and electrification materials.

The method for predicting a molecular structure according to an embodiment may perform a calculation 600 times or more faster than the conventional quantum chemistry method (based on 309 atoms) and a simulation on greater than or equal to about 1,122 atoms, which are larger than that (100 to 200 atoms) of the conventional quantum chemistry method and in addition, may verify a phenomenon that nanoparticles are aggregated in terms of a nanoparticle size, as a temperature is increased.

All the processes of the method for predicting a molecular structure according to an embodiment may be calculated in a CPU/GPU device, from which the potential value may be provided as a file.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A method for predicting a molecular structure, the method comprising:
   preparing, by a CPU or GPU device, a learning data set including first learning data including eigenvector values and quantum mechanics calculation values for a monoatomic and molecular structural model, a bulk structural model, a slab structural model, a nanoparticle structural model, a defect structural model, and an amorphous structural model of a material including a plurality of elements;
   learning, by the CPU or GPU device, an artificial neural network using the learning data set to obtain a potential value, and wherein the potential value is provided as a file;
   predicting, by the CPU or GPU device, a molecular structure of another material by using the potential value; and
   using the molecular structure of the other material to dissolve, aggregate, or react the other material in the fields of semiconductors, magnetics, energy materials, and electrification materials,
   wherein the learning data set further comprises second learning data comprising an eigenvector value and a quantum mechanics calculation value for a structural model obtained by molecular dynamics calculation using an effective medium theory potential value, and
   wherein the learning data set further comprises third learning data comprising an eigenvector value and a quantum mechanics calculation value for a structural model in which quantum mechanical calculation values are different from predicted values obtained using the first learning data and the second learning data.

2. The method of claim 1, wherein
   the learning data set further comprises fourth learning data comprising an eigenvector value and a quantum mechanics calculation value for a structural model generated during stable structural relaxation of an amorphous structural model, a structural model generated during stable structural relaxation of a defect structural model, a structural model generated during stable structural relaxation of the slab structural model, or a combination thereof.

3. The method of claim 2, wherein
   the learning data set further comprises fifth learning data comprising an eigenvector value and a quantum mechanics calculation value for a structural model generated during stable structural relaxation of a structure obtained by molecular dynamics calculation using an effective medium theoretical potential value or a structural model generated during stable structural relaxation of a structural model of the third learning data.

4. The method of claim 3, wherein
   the learning data set comprises sixth learning data comprising the first learning data to the fifth learning data.

5. The method of claim 3, wherein
   the learning data set comprises seventh learning data comprising the first learning data and the fifth learning data.

6. The method of claim 1, wherein
   in the obtaining of the potential value,
   each of the eigenvector values for the monoatomic and molecular structural model, the bulk structural model, the slab structural model, the nanoparticle structural model, the defect structural model, and the amorphous structural model is an input value of the artificial neural network, and
   a potential value for the molecular structure of the material is an output value.

7. The method of claim 6, wherein
   in the obtaining of the potential value, when an error of the output value is greater than or equal to 25 meV/atom, reconstructing the learning data set and then learning the artificial neural network using the reconstructed learning data set to obtain the potential value are repeated.

8. The method of claim 1, wherein
   the eigenvector values for the monoatomic and molecular structural model, the bulk structural model, the slab structural model, the nanoparticle structural model, the defect structural model, and the amorphous structural model are obtained by Equation 1 or Equation 2,
   wherein Equation 1 comprises:

$$G_i^{II} = \sum_{j \neq i}^{\substack{atoms\ j\ within\ R_C \\ distance\ of\ atom\ 1}} e^{-\eta(R_{ij}-R_s)^2/R_c^2} f_c(R_{ij})$$

wherein, in Equation 1, $R_{ij}$ is a distance between atom i and atom j, $R_s$ and $\eta$ are variables controlling a shape of a graph, $f_c$ is a cut-off function, which is expressed by Equation 3, wherein Equation 2 comprises:

$$G_i^{IV} = 2^{1-\varsigma} \sum_{\substack{j,k \neq i \\ (j \neq k)}}^{\substack{\text{atoms } j,k \text{ within } R_C \\ \text{distance of atom } i}} (1 + \lambda\cos\theta_{ijk})^\varsigma e^{-\eta(R_{ij}^2 + R_{ik}^2 + R_{jk}^2)/R_c^2} f_c(R_{ij}) f_c(R_{ik}) f_c(R_{jk})$$

wherein, in Equation 2, $R_{ij}$ is a distance between atom i and atom j, Rik is a distance between atom i and atom k, $R_{jk}$ is a distance between atom j and atom k, $R_s$, $\eta$, $\lambda$, and $\zeta$ are variables controlling the shape of a graph, and $f_c$ is a cut-off function, which is expressed by Equation 3, wherein Equation 3 comprises:

when r≠$R_c$, $$fc = 0.5\left(1 + \cos\left(\pi\frac{r}{Rc}\right)\right)$$

when r>$R_c$, $f_c$=0 wherein, in Equation 3, r is a radius of a neighbor atom from a center atom and Rc is a limiting radius for limiting an effect on the center atom.

9. The method of claim 8, wherein the eigenvector values are obtained by changing $\eta$, $\lambda$, $\zeta$, or a combination thereof in Equation 1 or Equation 2.

\* \* \* \* \*